United States Patent
Shah et al.

(10) Patent No.: US 8,892,218 B2
(45) Date of Patent: Nov. 18, 2014

(54) MULTIPLE BOOLEAN INPUTS AND OUTPUTS FOR DEVICE FUNCTION BLOCKS

(75) Inventors: Harsh Shah, Cleveland, OH (US); James Edward Joe, Waukesha, WI (US); Jian Feng, Shanghai (CN); Tao Song, Shanghai (CN); Zhen Wei, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 414 days.

(21) Appl. No.: 12/895,271

(22) Filed: Sep. 30, 2010

(65) Prior Publication Data
US 2011/0202147 A1 Aug. 18, 2011

Related U.S. Application Data (60) Provisional application No. 61/304,227, filed on Feb. 12, 2010, provisional application No. 61/304,261, filed on Feb. 12, 2010, provisional application No. 61/304,275, filed on Feb. 12, 2010.

(51) Int. Cl.
G05B 19/045 (2006.01)
G05B 19/042 (2006.01)

(52) U.S. Cl.
CPC .... *G05B 19/045* (2013.01); *G05B 2219/23274* (2013.01); *G05B 2219/25232* (2013.01); *G05B 19/0426* (2013.01); *G05B 2219/23258* (2013.01)
USPC .............................................. 700/12; 700/18

(58) Field of Classification Search
CPC ............. G05B 19/0426; G05B 19/045; G05B 2219/25232; G05B 2219/23274; G05B 2219/23258
USPC ...................................................... 700/12, 18
See application file for complete search history.

(56) References Cited

U.S. PATENT DOCUMENTS

| | | | |
|---|---|---|---|
| 4,302,820 A | | 11/1981 | Struger et al. |
| 5,030,939 A | * | 7/1991 | Lovick .......................... 340/500 |
| 5,168,441 A | * | 12/1992 | Onarheim et al. .............. 700/17 |
| 5,524,083 A | | 6/1996 | Horne et al. |
| 5,717,588 A | | 2/1998 | Yamane et al. |
| 6,018,335 A | | 1/2000 | Onley et al. |
| 6,061,603 A | | 5/2000 | Papadopoulos et al. |
| 6,459,557 B1 | | 10/2002 | Haensgen et al. |
| 6,466,827 B1 | | 10/2002 | Stine |
| 6,816,817 B1 | | 11/2004 | Retlich et al. |
| 6,819,960 B1 | | 11/2004 | McKelvey et al. |
| 6,832,118 B1 | | 12/2004 | Heberlein et al. |
| 6,901,316 B1 | | 5/2005 | Jensen et al. |
| 6,931,288 B1 | | 8/2005 | Lee et al. |
| 6,978,225 B2 | | 12/2005 | Retlich et al. |
| 6,999,824 B2 | | 2/2006 | Glanzer et al. |
| 7,016,744 B2 | | 3/2006 | Howard et al. |

(Continued)

FOREIGN PATENT DOCUMENTS

GB 2456037 A 7/2009

*Primary Examiner* — Ryan Jarrett
(74) *Attorney, Agent, or Firm* — Fletcher Yoder P.C.

(57) ABSTRACT

The present invention provides techniques for splitting bundled inputs and outputs into separated Boolean inputs and outputs for function blocks of automation devices. More specifically, previously-defined bundled inputs and outputs may be used, whereas separated Boolean inputs and outputs may be used as well. In other words, the newly added Boolean inputs and outputs do not replace, but rather compliment, the previously defined bundled inputs and outputs.

23 Claims, 10 Drawing Sheets

(56) References Cited

U.S. PATENT DOCUMENTS

| | | |
|---|---|---|
| 7,092,771 B2 | 8/2006 | Retlich et al. |
| 7,130,704 B2 | 10/2006 | McKelvey et al. |
| 7,272,457 B2 | 9/2007 | Glanzer et al. |
| 7,424,329 B2 | 9/2008 | McKelvey et al. |
| 7,486,999 B2 | 2/2009 | Glanzer et al. |
| 2003/0160782 A1 | 8/2003 | Kawai et al. |
| 2004/0221262 A1 | 11/2004 | Hampapuram et al. |
| 2004/0229657 A1 | 11/2004 | Nakanishi |
| 2004/0243654 A1* | 12/2004 | Burr et al. ............. 708/164 |
| 2004/0260412 A1 | 12/2004 | Yasui et al. |
| 2005/0055111 A1 | 3/2005 | Law et al. |
| 2006/0206218 A1 | 9/2006 | Glanzer et al. |
| 2006/0253205 A1 | 11/2006 | Gardiner |
| 2008/0004727 A1 | 1/2008 | Glanzer et al. |
| 2008/0228289 A1 | 9/2008 | Hwang et al. |
| 2008/0288618 A1 | 11/2008 | Vardi et al. |
| 2008/0294986 A1 | 11/2008 | Seo et al. |
| 2010/0131081 A1 | 5/2010 | Brown et al. |

* cited by examiner

| FUNCTION BLOCK | ADDED BOOLEAN OUTPUTS | COMMENTS | NEW LADDER GRAPHICS | NEW FB GRAPHICS |
|---|---|---|---|---|
| ALARM | - HHLimit<br>- HLimit<br>- LLimit<br>- LLLimit | SPLIT FROM THE BUNDLE OUTPUT, INSTANCE ATTRIBUTE 7, ALARM OUTPUT | ─ALM─<br>Alarm 1 ─( EN )─<br>ALM_1 ☐ ─( HHAlarm )─<br>In ? ─( HAlarm )─<br>?? ─( LAlarm )─<br>HHLimit 0 ─( LLAlarm )─<br>HLimit 0<br>LLimit 0<br>LLLimit 0<br>Out ?<br>0 | ALM_01<br>ALM<br>Alarm<br>─EnableIn EnableOut─<br>─In HHAlarm─<br>HAlarm─<br>LAlarm─<br>LLAlarm─ |
| TIMING DIAGNOSIS | - NORMAL FINISH<br>- EARLY FINISH<br>- LATE FINISH<br>- RETRIGGERED<br>- TRIGGERED | SPLIT FROM THE BUNDLE OUTPUT, INSTANCE ATTRIBUTE 5, OUTPUT | ─TDG─<br>Timing Diagnosis 1 ─( EN )─<br>TDG_1 ☐ ─( Normal )─<br>TrigStart ? ─( Early )─<br>?? ─( Late )─<br>TrigFinish ? ─( Retrig )─<br>?? ─( Trig )─<br>Reset ?<br>??<br>MinTime 0<br>RangeTime 0<br>ElapsedTime 0<br>Out ?<br>0 | 1 TDG<br>Timing Diagnosis<br>─EnableIn EnableOut─<br>─TrigStart Normal─<br>─TrigFinish Early─<br>─Reset Late─<br>Retrig─<br>Trig─ |

TO FIG. 7B

FROM FIG. 7A

| | | | PID | |
|---|---|---|---|---|
| PID | - CV IS BELOW MINIMUM OUTPUT LIMIT<br>- CV IS ABOVE MAXIMUM OUTPUT LIMIT<br>- ERROR IS WITHIN DEADBAND<br>- DEVIATION IS ALARMED HIGH<br>- DEVIATION IS ALARMED LOW<br>- SP IS OUT OF RANGE<br>- PV IS OUT OF RANGE | SPLIT FROM THE BUNDLE OUTPUT, INSTANCE ATTRIBUTE 30, ALARM STATUS | PID — 1 —( EN )<br>PID_1 □ —(CVAtLLimit)—<br>PV ? —(CVAtHLimit)—<br>?? —(ErrorInDB)—<br>SP ? —(DevHAlarm)—<br>0.000000 —(DevLAlarm)—<br>Mode ? —(SPAlarm)—<br>0 —(PVAlarm)—<br>CVEU ?<br>0.000000<br>Alarm ?<br>0 | 1 PID □<br>PID<br>—Q EnableIn EnableOut Q—<br>—Q PV CVEU Q—<br>—Q SP CVLowLim Q—<br>—Q Mode CVHighLim Q—<br>ErrorInDB Q—<br>DevHigh Q—<br>DevLow Q—<br>SPOutRange Q—<br>PVOutRange Q— |
| HIGH-LOW LIMIT | - LIMITING APPLIED<br>- HIGH LIMITING APPLIED<br>- LOW LIMITING APPLIED | A REAL INSTANCE ATTRIBUTE TYPED WITH WORD AS THE BUNDLE FOR THESE STATES SHOULD BE DEFINED | HLL<br>High/Low Limit — 1 —( EN )<br>HLL_1 □ —(InAlarm)—<br>In ? —(HighAlarm)—<br>?? —(LowAlarm)—<br>HighLimit 0<br>LowLimit 0<br>Out ?<br>0 | 1 HLL □<br>High/Low Limit<br>—Q EnableIn EnableOut Q—<br>—Q In Out Q—<br>InAlarm Q—<br>HighAlarm Q—<br>LowAlarm Q— |

```
$ Sample Electronic Data Sheet illustrating the Alarm Function Block Object Section
.
[I_LEOSUPPORT]
...
[I_ALARM]
I_VALID_OPT_TYPES = 0, 0xc4, 0xca;
I_CLASS_ATTR_SUPPORT = 1, 8;
I_INST_ATTR_SUPPORT = 1, 2, 3, 4, 5, 6, 7, 9, 10, 20, 21, 22, 23;
I_FB_OUT_LIST = 1, "Enable Output", I_FUNCTION_BLOCK_OUTPUT_3, 2, 0,
            S 2, "Alarm Output", I_FUNCTION_BLOCK_OUTPUT_2, 2, 0,
            3, "HHAlarm", I_FUNCTION_BLOCK_OUTPUT_8, 2, 3,
            4, "HAlarm", I_FUNCTION_BLOCK_OUTPUT_8, 2, 2,
            5, "LAlarm", I_FUNCTION_BLOCK_OUTPUT_8, 2, 1,
            6, "LLAlarm", I_FUNCTION_BLOCK_OUTPUT_8, 2, 0;
```

```
$ Sample Electronic Data Sheet illustrating the Timing Diagnosis Function Block Object Section
.
[I_LEOSUPPORT]
...
[I_TDIG]
I_CLASS_ATTR_SUPPORT = 1, 8;
I_INST_ATTR_SUPPORT = 1, 2, 3, 4, 5, 6, 7, 20, 21, 22, 23;
I_FB_OUT_LIST = 1, "Enable Output", I_FUNCTION_BLOCK_OUTPUT_3, 2, 0,
            S 2, "FB Output", I_FUNCTION_BLOCK_OUTPUT_2, 2, 0,
            3, "Normal", I_FUNCTION_BLOCK_OUTPUT_8, 2, 0,
            4, "Early", I_FUNCTION_BLOCK_OUTPUT_8, 2, 1,
            5, "Late", I_FUNCTION_BLOCK_OUTPUT_8, 2, 2,
            6, "Retrig", I_FUNCTION_BLOCK_OUTPUT_8, 2, 3,
            7, "Trig", I_FUNCTION_BLOCK_OUTPUT_8, 2, 4;
```

```
$ Sample Electronic Data Sheet illustrating the PID Function Block Object Section
.
[1_LEOSUPPORT]
...
[1_PID]
1_CLASS_ATTR_SUPPORT = 1, 8;
1_INST_ATTR_SUPPORT = 1, 2, 3, 4, 5, 6, 7, 8, 9, 10, 11, 12, 13, 14, 15, 16, 17, 18, 20, 21, 22, 24, 25, 26, 27,
28, 29, 30;
1_FB_OUT_LIST = 1, "Enable Output", 1_FUNCTION_BLOCK_OUTPUT_3, 2, 0,
                2, "CV Output", 1_FUNCTION_BLOCK_OUTPUT_2, 2, 0,
              $ 3, "Alarm Status", 1_FUNCTION_BLOCK_OUTPUT_7, 2, 0,
                4, "CVAtLLimit", 1_FUNCTION_BLOCK_OUTPUT_8, 2, 0,
                5, "CVAtHLimit", 1_FUNCTION_BLOCK_OUTPUT_8, 2, 1,
                6, "ErrorInDB", 1_FUNCTION_BLOCK_OUTPUT_8, 2, 2,
                7, "DevHAlarm", 1_FUNCTION_BLOCK_OUTPUT_8, 2, 3,
                8, "DevLAlarm", 1_FUNCTION_BLOCK_OUTPUT_8, 2, 4,
                9, "SPAlarm", 1_FUNCTION_BLOCK_OUTPUT_8, 2, 5,
               10, "PVAlarm", 1_FUNCTION_BLOCK_OUTPUT_8, 2, 6;
```

```
$ Sample Electronic Data Sheet illustrating the High-Low Limit Function Block Object Section
.
[1_LEOSUPPORT]
...
[1_HLLIM]
1_VALID_OPT_TYPES = 0, 0xc4, 0xca;
1_CLASS_ATTR_SUPPORT = 1, 8;
1_INST_ATTR_SUPPORT = 1, 2, 3, 4, 5, 6, 7, 8, 9, 20, 21, 22, 23;
1_FB_OUT_LIST = 1, "Enable Output", 1_FUNCTION_BLOCK_OUTPUT_3, 2, 0,
                2, "FB Output", 1_FUNCTION_BLOCK_OUTPUT_2, 2, 0,
                3, "InAlarm", 1_FUNCTION_BLOCK_OUTPUT_8, 2, 0,
                4, "HighAlarm", 1_FUNCTION_BLOCK_OUTPUT_8, 2, 1,
                5, "LowAlarm", 1_FUNCTION_BLOCK_OUTPUT_8, 2, 2;
```

```
$ Sample Electronic Data Sheet illustrating the PID Function Block Object Section
[1_LEOSUPPORT]
...
[1_BINDING_PATHS]]
$$$$$$$$$$$$$$$$$$$$$$$$$$$$$$$$$$$$$$$$$$
$  Additional Multiple FB outputs              $
$$$$$$$$$$$$$$$$$$$$$$$$$$$$$$$$$$$ $$$$$$$$$$
1_FUNCTION_BLOCK_OUTPUT_8 =
                        1, "21 6a 00 24 08 29 00 00", 8, 0,
                        1, "21 6a 00 24 08 29 01 00", 8, 1,
                        1, "21 6a 00 24 08 29 02 00", 8, 2,
                        1, "21 6a 00 24 08 29 03 00", 8, 3,
                        1, "21 6a 00 24 08 29 04 00", 8, 4,
                        1, "21 6a 00 24 08 29 05 00", 8, 5,
                        1, "21 6a 00 24 08 29 06 00", 8, 6,
                        1, "21 6a 00 24 08 29 07 00", 8, 7,
                        2, "21 6a 00 24 08 29 10 00", 8, 16,
                        2, "21 6a 00 24 08 29 11 00", 8, 17,
                        2, "21 6a 00 24 08 29 12 00", 8, 18,
                        2, "21 6a 00 24 08 29 13 00", 8, 19,
                        2, "21 6a 00 24 08 29 14 00", 8, 20,
                        2, "21 6a 00 24 08 29 15 00", 8, 21,
                        2, "21 6a 00 24 08 29 16 00", 8, 22,
                        2, "21 6a 00 24 08 29 17 00", 8, 23,
                        3, "21 6a 00 24 08 29 20 00", 8, 32,
                        3, "21 6a 00 24 08 29 21 00", 8, 33,
                        3, "21 6a 00 24 08 29 22 00", 8, 34,
                        3, "21 6a 00 24 08 29 23 00", 8, 35,
                        3, "21 6a 00 24 08 29 24 00", 8, 36,
                        3, "21 6a 00 24 08 29 25 00", 8, 37,
                        3, "21 6a 00 24 08 29 26 00", 8, 38,
                        3, "21 6a 00 24 08 29 27 00", 8, 39,
                        4, "21 6a 00 24 08 29 30 00", 8, 48,
                        4, "21 6a 00 24 08 29 31 00", 8, 49,
                        4, "21 6a 00 24 08 29 32 00", 8, 50,
                        4, "21 6a 00 24 08 29 33 00", 8, 51,
                        4, "21 6a 00 24 08 29 34 00", 8, 52,
                        4, "21 6a 00 24 08 29 35 00", 8, 53,
                        4, "21 6a 00 24 08 29 36 00", 8, 54,   $ if more FBs are supported,
                        4, "21 6a 00 24 08 29 37 00", 8, 55;   $ new elements should be added.
```

FIG. 12

| FUNCTION BLOCK | ADDED BOOLEAN INPUTS | COMMENTS | NEW LADDER GRAPHICS | NEW FB GRAPHICS |
|---|---|---|---|---|
| TIMER | - PRESET TIME BINDING PATH | AS THE DEFINED INSTANCE ATTRIBUTE 3, PRESET TIME BINDING PATH | TONR Timer On Delay with Reset 1 — EN, TONR_1 — DN, PRE ?, 0, TimeBase 0, ACC ?, 0 | 1 TONR Timer On Delay with Reset, EnableIn EnableOut, TimerEnable DN, PRE ACC, Reset |
| COUNTER | - PRESET VALUE BINDING PATH | AS THE DEFINED INSTANCE ATTRIBUTE 4, PRESET VALUE BINDING PATH | CTU Count Up 1 — EN, CNTR_1 — DN, PRE ?, 0, ACC ?, 0 | 1 CTU Count Up, EnableIn EnableOut, CUEnable DN, PRE ACC, Reset |

FIG. 13

```
┌─────────────────────────────┐
│   ACCESS A MULTI-BOOLEAN    │──88
│      FUNCTION BLOCK         │
└─────────────┬───────────────┘
              ↓
┌─────────────────────────────┐
│       CONFIGURE THE         │
│ MULTI-BOOLEAN FUNCTION BLOCK │──90
│   FOR A PARTICULAR PROCESS   │
└─────────────┬───────────────┘
              ↓
┌─────────────────────────────┐
│  DOWNLOAD THE CONFIGURED    │
│ MULTI-BOOLEAN FUNCTION BLOCK │──92
│   INTO A LOW-LEVEL DEVICE   │
└─────────────────────────────┘
```

FIG. 14

MULTIPLE BOOLEAN INPUTS AND OUTPUTS FOR DEVICE FUNCTION BLOCKS

CROSS REFERENCE TO RELATED APPLICATIONS

This application is a Non-Provisional patent application claiming priority to U.S. Provisional Patent Application No. 61/304,227, entitled "Multiple Boolean Inputs and Outputs for Device Function Blocks", filed Feb. 12, 2010, U.S. Provisional Patent Application No. 61/304,261, entitled "Automatic Device Parameter Binding Method", filed Feb. 12, 2010, and U.S. Provisional Patent Application No. 61/304,275, entitled "Macro Function Block for Encapsulating Device-Level Embedded Logic", filed Feb. 12, 2010, all of which are herein incorporated by reference.

BACKGROUND

The present invention relates generally to the field of configuring logic instructions in automation devices, and more specifically to techniques for enabling multiple Boolean inputs and outputs for function blocks of automation devices.

Logic solving capability may be programmed into various sensor and actuator devices, such as input/output (I/O) devices, motor drives, relays, push buttons, and other automation devices to improve the performance of the devices and to enable limited but rapid response to automation needs without specific direction from a central automation controller. For example, such logic solving capability may control outputs and manage status information of the automation devices to control operation of other components directly or closely connected to the devices. The configuration of the logic solving capability may be accomplished through visual editing tools, which provide graphical interfaces for configuring functions blocks that encompass the local control functions for the devices. Such distributed control allows low-level devices to perform operations heretofore performed only by reference to logic in one or more network-connected automation controllers.

However, in some situations in existing automation devices, the function blocks may have constraints relating to the number of inputs and outputs. For example, a function block may be limited to only one input or only one output. One method for accommodating such limitations is to program the function block to generate the most frequently-used logic results. However, this type of bundled output may prove inconvenient in many situations and may not actually accommodate the type or granularity of control desired. For example, in certain situations, an end user program may only be interested in one or two bits of the bundled output. Therefore, a mask function block may be required to mask bits that are not needed.

BRIEF DESCRIPTION

The present invention provides techniques for splitting bundled inputs and outputs into separated Boolean inputs and outputs for function blocks of automation devices. More specifically, previously-defined bundled inputs and outputs may be used, whereas separated Boolean inputs and outputs may be used as well. In other words, the newly added Boolean inputs and outputs do not replace, but rather compliment, the previously defined bundled inputs and outputs.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
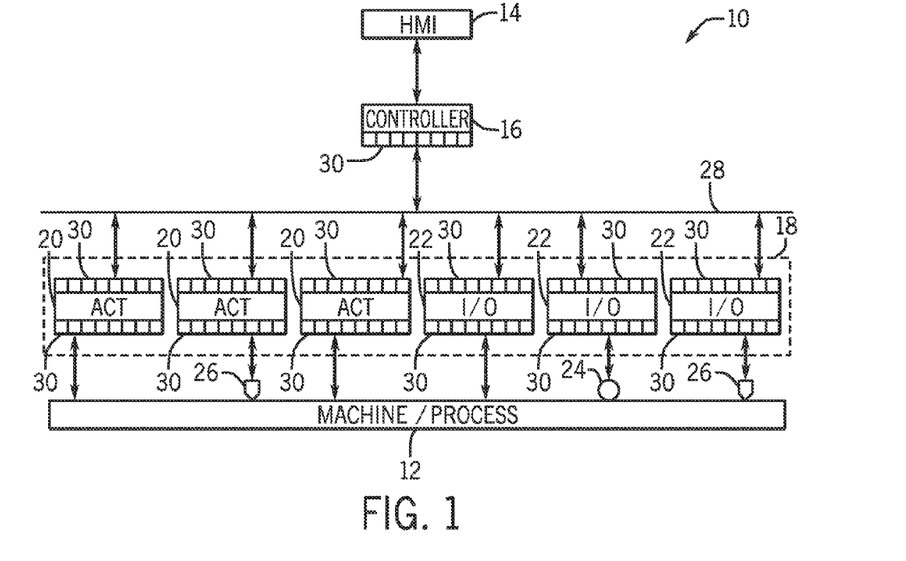
FIG. 1 is a diagrammatical representation of an exemplary control and monitoring system for controlling and monitoring a machine and/or process.

FIG. 1 is a diagrammatical representation of an exemplary control and monitoring system 10, such as for industrial automation, for controlling and monitoring a machine and/or process 12. The system 10 includes a human-machine interface (HMI) 14 adapted to collaborate with components of the machine/process 12 through an automation controller 16 (e.g., a remote computer, programmable logic controller (PLC), or other controller). The automation controller 16 is adapted to control and monitor automation devices 18, such as the actuators 20 and the input/output (I/O) devices 22 (typically sensors or I/O modules coupled to sensors) illustrated in FIG. 1. Specific examples of low-level automation devices 18 as described herein include I/O terminals, motor drives, motor starters, overload relays and other types of relays, push buttons, and so forth. The automation devices 18 may interact directly with the machine/process 12 or may interact with other automation devices 18, such as the sensors 24 and actuators 26 illustrated in FIG. 1. Collaboration between the HMI 14, the automation controller 16, and automation devices 18 of the machine/process 12 may be facilitated by using any suitable network strategies. Indeed, an industry standard network 28 may be employed, such as DeviceNet, ControlNet, Profibus, Modbus, or more common standards such as EtherNet and Internet protocols, to enable data transfer. Such networks 28 permit the exchange of data in accordance with a predefined protocol, and may also provide power for operation of networked elements.

As described in greater detail below, the automation devices 18 may include processors, memory, and low-level embedded logic to enable local (e.g., distributed) control of the automation devices 18 with or without the need to communicate with HMIs 14 or automation controllers 16 (at least prior to making a control decision). The automation devices 18 may include functionality by which they read from or write to specific memory or registers of memory. For example, the automation devices 18 may write to or read from registers 30 of one or more automation controllers 16 or even local registers 30 within the automation devices 18 (including registers within other low-level devices). In a simple case, for example, an automation device 18 may simply access a piece of data (e.g., a state of a component as determined by a sensor), and generate an output signal to write a value to one or more registers 30 corresponding to the state of a different networked device. Much more complex functionality can, of course, be configured. In an industrial control and monitoring context, for example, such automation devices 18 may emulate operation of a range of physical components, such as a momentary contact push button, a push button with delayed output, a switch, and so forth. As described in greater detail below, many pre-programmed device elements (e.g., function blocks) may be available for use by the automation devices 18. Such function blocks may be accessible via a network, or may be resident on the automation devices 18.

Figure 2:
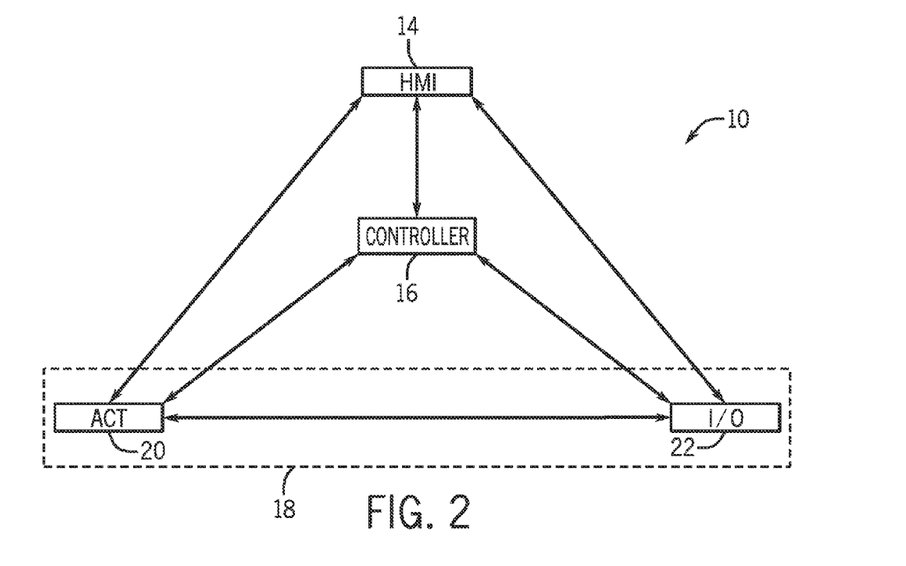
FIG. 2 is a diagrammatical representation of relationships of the exemplary control and monitoring system of FIG. 1.

FIG. 2 is a diagrammatical representation of relationships of the exemplary control and monitoring system 10 of FIG. 1. As illustrated, the HMIs 14, automation controllers 16, actuators 20, and I/O devices 22 form a somewhat triangular hierarchical relationship, with the automation controllers 16 in the center of hierarchy, and the automation devices 18 (e.g., the actuators 20 and the I/O devices 22) at the lower end of the hierarchy. As illustrated, all of the components of the control and monitoring system 10 may communicate with each other, but the low-level automation devices 18 typically receive commands from the automation controllers 16 and/or the HMIs 14. However, the disclosed embodiments enable more robust distributed control of the automation devices 18 by embedding low-level logic directly into the automation devices 18 such that they are capable of making low-level computations and decisions without the need to communicate with the HMIs 14 or the automation controllers 16, at least before the computations and decisions are made, and may output signals generated by the computations and decisions without specific commands from the automation controller 16 or the HMI 14. In other words, the disclosed embodiments enable component level devices, component class devices, architecture level devices, and architecture class devices (e.g., I/O terminals, motor drives, motor starters, overload relays and other types of relays, push buttons, and so forth) to be embedded with low-level automation control logic. This proves advantageous, for example, when the network 28 described in FIG. 1 is experiencing temporary communication problems, or simply when local computations and decisions are desirable.

Figure 3:
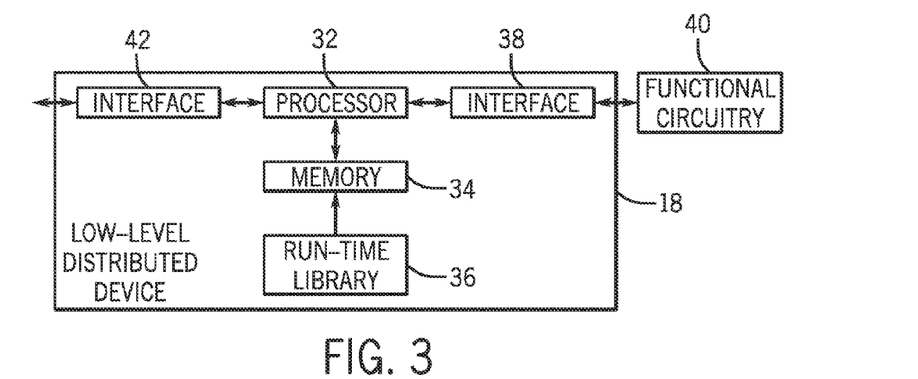
FIG. 3 is a block diagram of components of an exemplary automation device.

FIG. 3 is a block diagram of components of an exemplary automation device 18. As illustrated, each automation device 18 may comprise a configurable tool built around a microprocessor 32. In addition to the processor 32, the illustrated embodiment includes a memory module 34, which may store data and routines (e.g., computer programs) and components such as a run-time library 36 that includes the pre-programmed device elements (e.g., function blocks) described above. The memory module 34 may also include configuration information for the respective automation device 18. For example, as described in greater detail below, each automation device 18 may be configured with a specific combination of function blocks such that the automation device 18 may be capable of performing certain functions locally for the machine/process 12. In particular, the processor 32 is configured to execute the function blocks such that the low-level distributed control functions are performed by the automation device 18.

As described below, a configuration station may be used to write (i.e., download) the specific combination of function blocks to the automation device 18. Conversely, as also described below, the specific combination of function blocks may be read (i.e., uploaded) from the automation device 18 by configuration software of the configuration station. The function blocks are non-transitory code configured in an object oriented programming language. Certain of the function blocks may be configured to read at least one input from and/or write at least one output to one or more of the registers 30 described above. As described below, in a present embodiment, the function blocks themselves comprise objects defined in an object oriented language. Such objects will typically be defined by code that establishes data structures consisting of data fields and methods. The fields may themselves define the properties of the object, while the methods define operations performed by the object during real-time operation of the automation system. The resulting objects form self-sufficient modules that can read from particular memory addresses (e.g., registers 30), write to particular memory addresses, receive inputs (e.g., from sensors), and output signals (e.g., to actuators) based upon their own data structures and methods.

Each automation device 18 also includes a first interface 38 for communicating with functional circuitry 40, such as low-level sensors that provide sensor readings as inputs, low-level actuators that accept outputs generated by the function blocks executed by the processor 32, and so forth. In addition, the automation device 18 also includes a second interface 42 for communicating with a configuration station during configuration of the automation device 18 and/or for communicating with HMIs 14 and/or automation controllers 16 during operation of the automation device 18.

Figure 4:
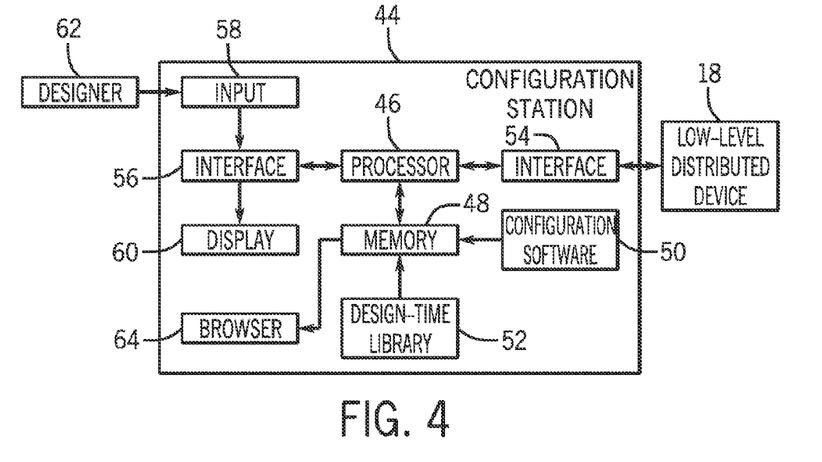
FIG. 4 is a block diagram of components of an exemplary configuration station for configuring the automation devices of FIG. 3.

FIG. 4 is a block diagram of components of an exemplary configuration station 44 for configuring the automation devices 18 of FIG. 3. As illustrated, the configuration station 44 may include configuration software executed by a processor 46. In addition to the processor 46, the illustrated embodiment includes a memory module 48, which may store computer programs and components such as configuration software 50 and a design-time library 52 that includes the pre-programmed device elements (e.g., function blocks) described above. The configuration station 44 is capable of configuring the automation devices 18 with specific combinations of function blocks such that the automation devices 18 may be capable of performing certain functions locally for the machine/process 12. The configuration software may be installed on the configuration station 44 (e.g., as a stand-alone application), or may be accessed by any of a range of remote data exchange schemes (e.g., through a computer browser). Moreover, in some implementations, the configuration or design-time environment may be served to the configuration station 44 by the automation device 18 (e.g., by a server application operative on the automation device 18). In a presently contemplated embodiment, the configuration software 50 may include or be based upon a product available commercially under the designation RSNetWorx, from Rockwell Automation, Inc. of Milwaukee, Wis.

In particular, the configuration station 44 may be used to write, adapt, and load (i.e., download) a specific combination of function blocks to a specific automation device 18. Conversely, a specific combination of function blocks may be read (i.e., uploaded) from automation devices 18 by the configuration software 50 of the configuration station 52. Again, in a presently contemplated embodiment, the function blocks are non-transitory code configured in an object oriented programming language. Certain of the function blocks are configured to read at least one input from and/or write at least one output to one or more of the registers 30 described above.

The configuration station 44 also includes a first interface 54 for communicating with the automation devices 18, such that the configuration station 44 can write a specific combination of function blocks to a specific automation device 18 and read a specific combination of function blocks from a specific automation device 18. In addition, the configuration station 44 also includes a second interface 56 for communicating with an input device 58 and a display 60, which are used to receive inputs from a designer 62 (e.g., a user that configures the automation device 18 with the specific combination of function blocks) and visually display configuration information for the automation device 18, respectively. In particular, in certain embodiments, a browser 64 configured to display a visual representation of the function blocks for a specific automation device 18 may be displayed by the display 62. It should be noted that reference to a "browser" for viewing and modifying configuration of the automation devices 18 is not limited to web browsers or to any particular browser. References to the browser 64 are merely intended to be exemplary. More generally, the term "browser" is utilized herein to reference software which includes any general purpose viewer.

Figure 5:
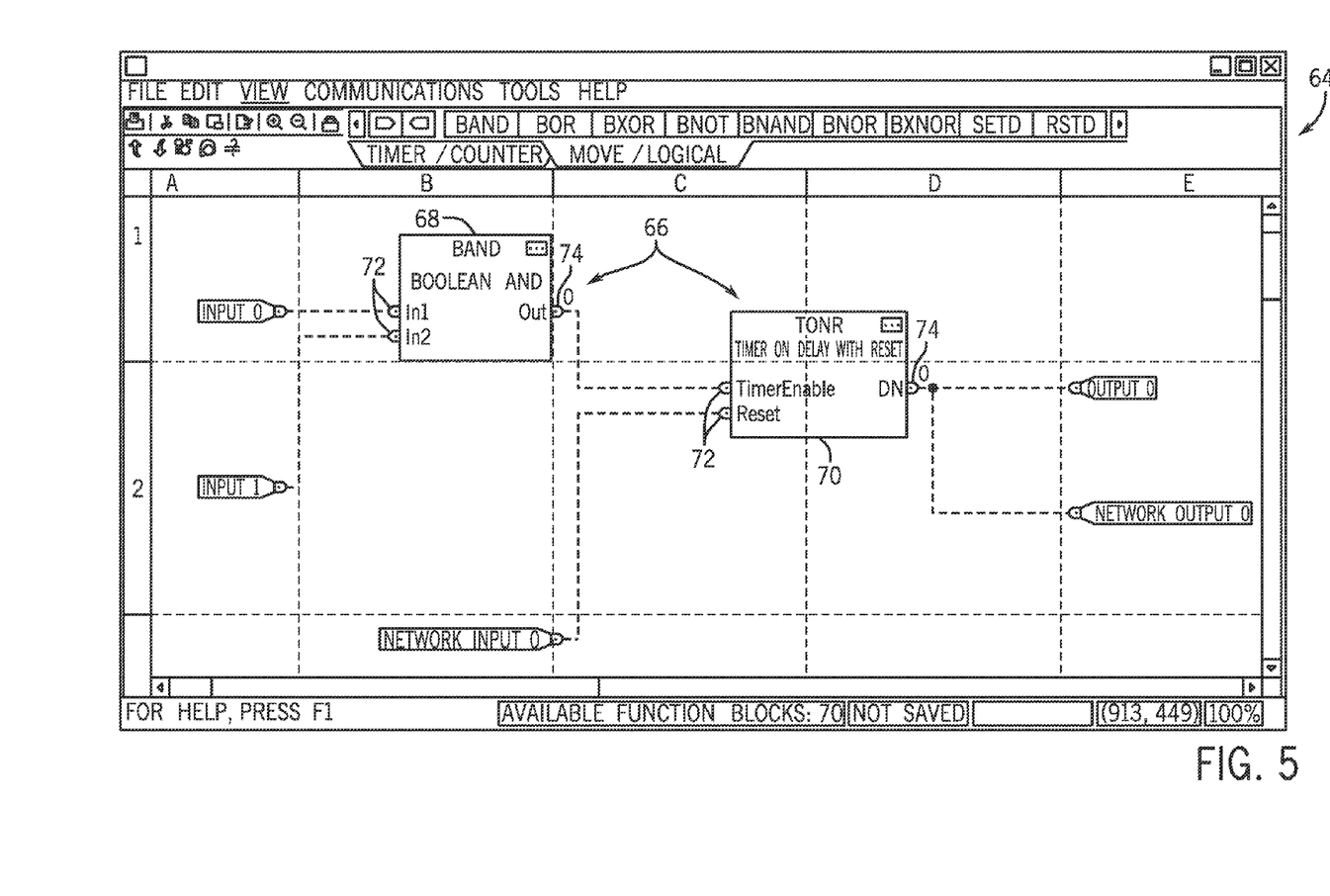
FIG. 5 is a visual representation of an exemplary browser of FIG. 4 for visually displaying the configuration of a particular automation device.

FIG. 5 is a visual representation of an exemplary browser 64 of FIG. 4 for visually displaying the configuration of a particular automation device 18. In particular, the browser 64 displayed in FIG. 5 may be referred to as a function block editor. As illustrated, the particular automation device 18 being configured includes two function blocks 66 (i.e., a Boolean And (BAND) function block 68 and a Timer On Delay with Reset (TONR) function block 70). As illustrated, the BAND function block 68 is configured to receive two inputs 72 and output one output 74. The two inputs 72 into the BAND function block 68 may, for example, be values read from a register 30. In the particular configuration illustrated in FIG. 5, the BAND function block 68 acts upon the two received inputs 72 and outputs the output 74, which is received by the TONR function block 70 as a first input 72 (e.g., TimerEnable). As illustrated, the TONR function block 70 also receives a second input 72 (Reset) from a network-linked source. The TONR function block 70 acts upon the two inputs 72 and outputs a single output 74. As illustrated, the single output 74 from the TONR function block 70 may, for example, be written to a register 30 as well as be sent to a network-linked source. The specific combination of function blocks 66 illustrated in the browser 64 of FIG. 5 are merely exemplary and not intended to be limiting. Although illustrated as only having two function blocks 66, numerous different function blocks 66 may be used for any given automation device 18. Indeed, the design-time library 52 used by the configuration software 50 of FIG. 4 (and, similarly, the run-time library 36 installed in the automation device 18) may include hundreds of different types of function blocks 66 including, for example, Boolean function blocks (e.g., AND, OR, XOR, NAND, NOR, XNOR, and so forth), bistable function blocks (e.g., RS Latch, SR Latch, and so forth), counter/timer function blocks (Up Counter, Up-Down Counter, Pulse Timer, On Delay Timer, Off Delay Timer, and so forth), and various other types of function blocks.

Each function block 66 may be configured to receive a plurality of inputs, to perform multiple logical operations (e.g., Boolean operations or more complex operations), based on the inputs, and to output any one of a plurality of logical outputs based upon the logical operations. In addition, each function block 66 may be configured for a particular automation process (e.g., the machine/process 12 of FIG. 1). For example, each function block 66 may be configured to interact with a plurality of memory registers 32 from which the function block 66 reads the plurality of inputs or to which the function block writes the plurality of logical outputs.

Figure 6:
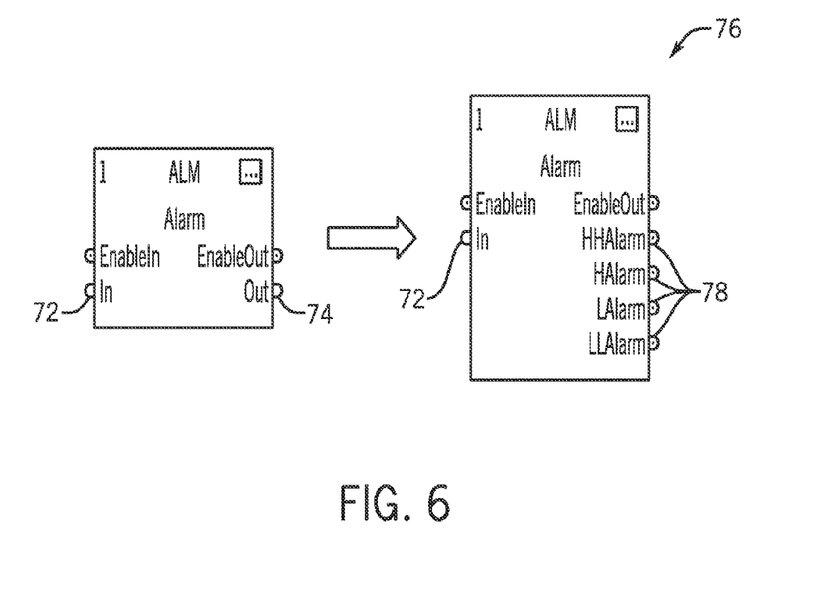
FIG. 6 is visual representation of an Alarm function block with and without bundled Boolean outputs.

However, as described above, in some situations, the function blocks 66 may have constraints relating to the number of inputs and outputs. For example, a function block 66 may be limited to only one input or only one output. One method for accommodating this type of constraint is to program the function block 66 to generate the most frequently-used logic results. For example, FIG. 6 is visual representation of an Alarm function block 76 with and without bundled Boolean outputs. As illustrated, the Alarm function block 76 with bundled Boolean outputs has only one input 72 and one output 74 (notwithstanding the EnableIn input and EnableOut output). More specifically, the Alarm function block 76 with bundled Boolean outputs illustrated on the left of FIG. 6 has four alarm bits (e.g., HHAlarm (high-high alarm), HAlarm (high alarm), LAlarm (low alarm), and LLAlarm (low-low alarm)) bundled into one typed word analog value output (i.e., the single "Out" output 74). However, this type of bundled output 74 may prove inconvenient in many situations. For example, in certain situations, an end user program may only be interested in one or two bits of the bundled output 74. Therefore, a Mask function block may be required to mask bits that are not needed.

To improve the usability of the function blocks 66, the disclosed embodiments provide techniques for splitting bundled inputs and outputs into separated bit (e.g., Boolean) inputs and outputs for their respective function blocks 66. In the case of the multi-Boolean Alarm function block 76 (i.e., without bundled outputs 74) illustrated on the right of FIG. 6, the Out output may be separated into four distinct bit outputs 78 (e.g., HHAlarm, HAlarm, LAlarm, and LLAlarm). The disclosed embodiments are intended as enhancements to previous designs and, as such, do not completely change the previous designs. Indeed, the disclosed embodiments are intended to minimize the impact upon current function block definitions. For instance, in the function block definitions, new Boolean outputs will be added but no corresponding attributes will be added.

Figure 7A:
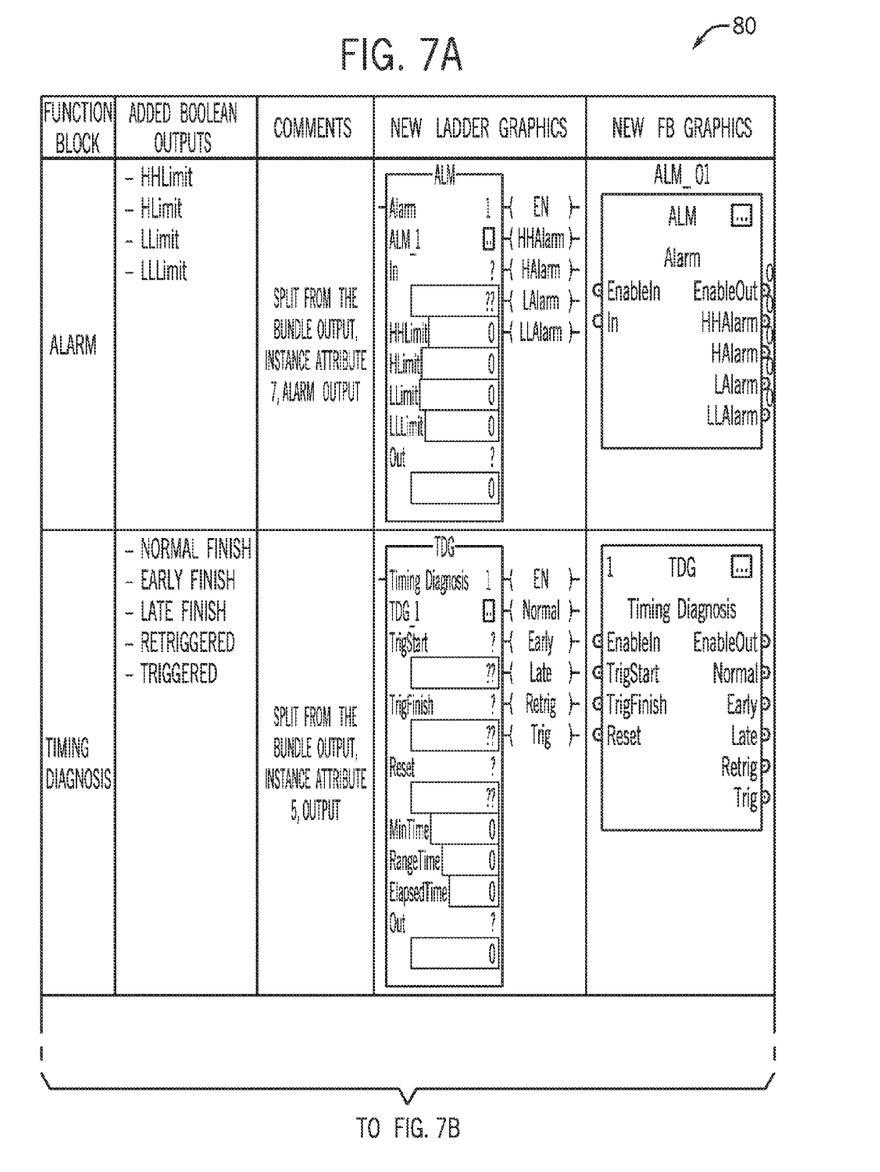
FIG. 7 is a list of exemplary function blocks having unbundled Boolean outputs.
Figure 7B:
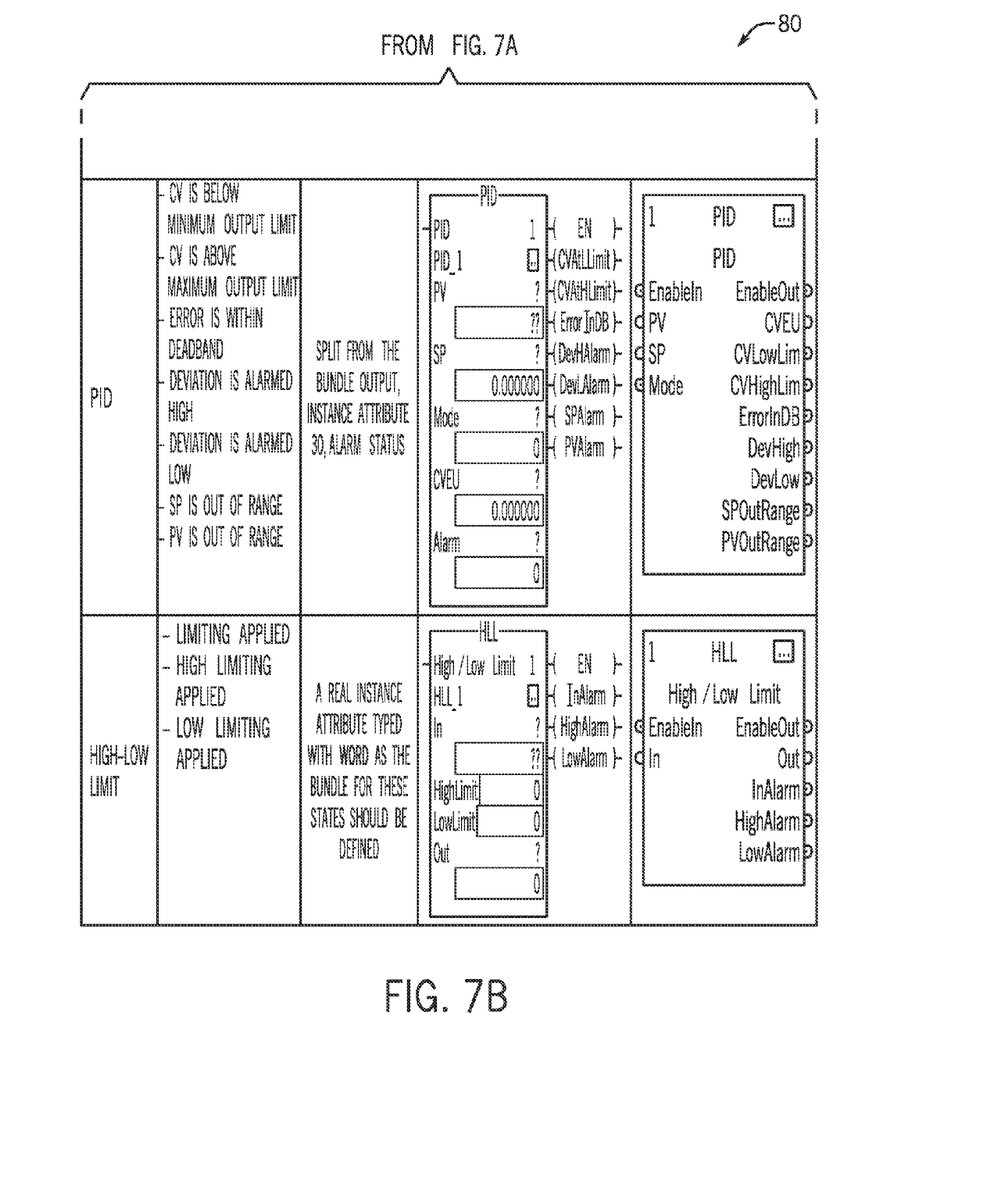
Figure 8:
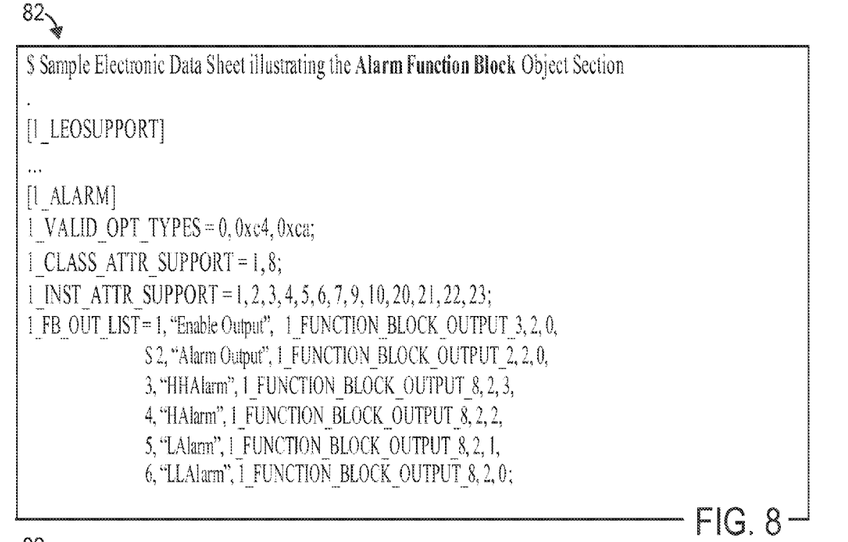
FIGS. 8 through 11 are portions of exemplary electronic data sheet (EDS) files for the Alarm function block, the Timing Diagnosis function block, the PID function block, and the High-Low Limit function block, respectively.
Figure 9:
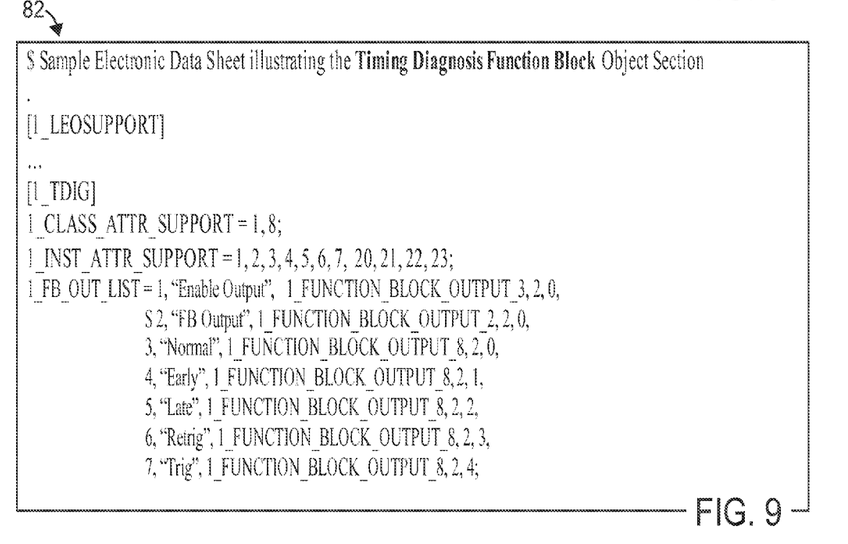
Figure 10:
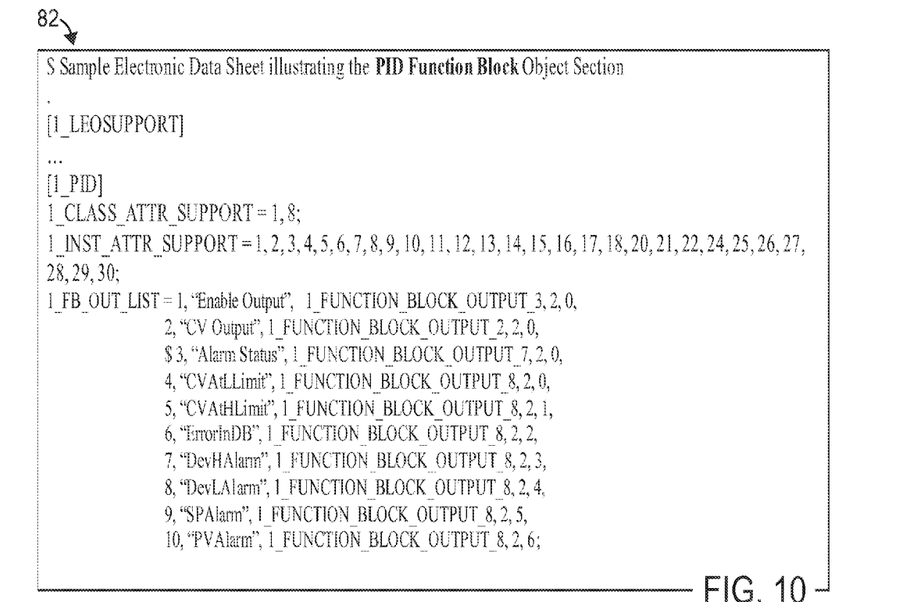
Figure 11:
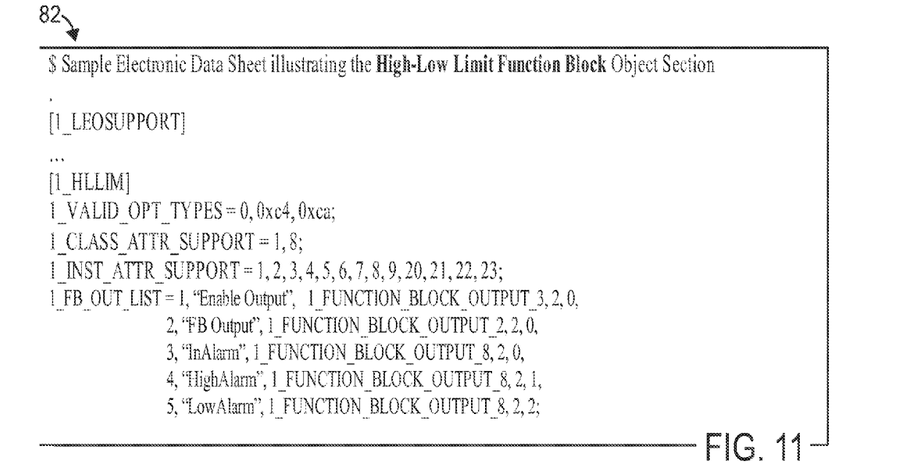

FIG. 7 is a list 80 of exemplary function blocks 66 having unbundled Boolean outputs 78. As shown, in the Alarm function block definition, the four new Boolean outputs 78 described above will be added to correspond to four bits of the output 74. In a Timing Diagnosis function block definition, five new Boolean outputs 78 (Normal (normal finish), Early (early finish), Late (late finish), Retrig (retriggered), and Trig (triggered)) will be added to correspond to five bits of the output 74. In a PID (proportional-integral-derivative) function block definition, seven new Boolean outputs 78 (CV-LowLim (control variable is below a minimum output limit), CVHighLim (control variable is above a maximum output limit), ErrorinDB (error is within deadband), DevHigh (deviation is alarmed high), DevLow (deviation is alarmed low), SPOutRange (setpoint is out of range), and PVOutRange (process variable is out of range)) will be added to correspond to seven bits of the output 74. In a High-Low Limit function block definition, three new Boolean outputs 78 (InAlarm (limiting is applied), HighAlarm (high limiting is applied), and LowAlarm (low limiting is applied)) will be added to correspond to three bits of the output 74.

The new Ladder graphics and FB (function block) graphics illustrated in FIG. 7 are two types of graphical representations for the function block inputs and outputs that may be displayed in the browser 64. It should be noted that the FB graphics for the Alarm, Timing Diagnosis, and PID function blocks illustrate the case where the EDS file (e.g., electronic data sheet file—a text file used by network configuration tools to help identify the automation devices 18 and easily commission them on the network 28) for a given automation device 18 does not indicate the support of the original bundled output 74.

To add the multiple Boolean input and output functionality, the firmware implementation (e.g., the run-time library 36 for the automation device 18) may need to be updated. A new data table instance may be added to match the multiple Boolean input and output functionality. The new data table instance may share the memory with the previous data table instance and, thus, no additional run-time memory (e.g., in the memory module 34 of the automation device 18) may be required for the multiple Boolean input and output functionality.

With respect to the EDS files for the automation devices 18, the disclosed embodiments do not change any definition that is already in use. FIGS. 8 through 11 are portions of exemplary electronic data sheet (EDS) files 82 for the Alarm function block, the Timing Diagnosis function block, the PID function block, and the High-Low Limit function block, respectively. The sample EDS files 82 of FIGS. 8 through 11 are for use with the new multiple Boolean input and output functionality. As illustrated, both the previous bundled outputs 74 and the new unbundled Boolean outputs are included in the EDS files 82. For example, for the Alarm function block, the previous Alarm Output and the new HHAlarm, HAlarm, LAlarm, and LLAlarm Boolean outputs are defined. For the Timing Diagnosis function block, the previous FB Output and the new Normal, Early, Late, Retrig, and Trig Boolean outputs are defined. For the PID function block, the previous Alarm Status and the new CVLowLim, CVHighLim, ErrorinDB, DevHigh, DevLow, SPOutRange, and PVOutRange Boolean outputs are defined. For the High-Low Limit function block, the previous FB Output and the new InAlarm, HighAlarm, and LowAlarm Boolean outputs are defined. Defining both the previous bundled outputs 74 and the new unbundled Boolean outputs 78 in the EDS files 82 enables both previous systems (e.g., those not updated with the new multiple Boolean input and output functionality) and newer systems (e.g., those updated with the new multiple Boolean input and output functionality) alike to function normally with the function blocks 66 defining the functionality of the automation devices 18. In other words, newer systems will have access to the more granular unbundled Boolean outputs 78, but previous systems may also function properly using the bundled outputs 74.

Figure 12:
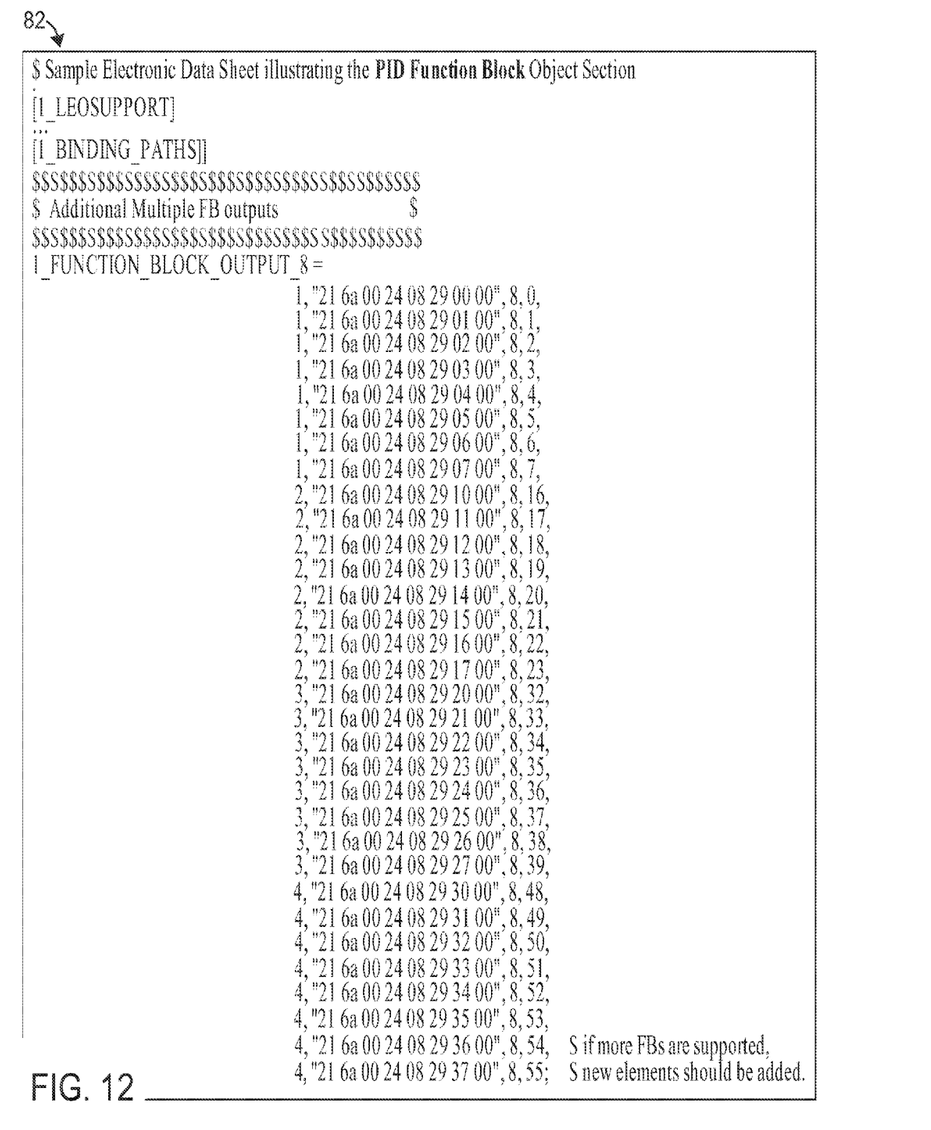
FIG. 12 is a portion of an exemplary EDS file for the PID function block.

In addition, new outputs and related data table instances will also be added. FIG. 12 is a portion of an exemplary EDS file 82 for the PID function block. As illustrated, a 1_FUNCTION_BLOCK_OUTPUT_8 is the entry of the new data table. Each of the entries corresponds to a path in a register 30 corresponding to the function block output.

Figure 13:
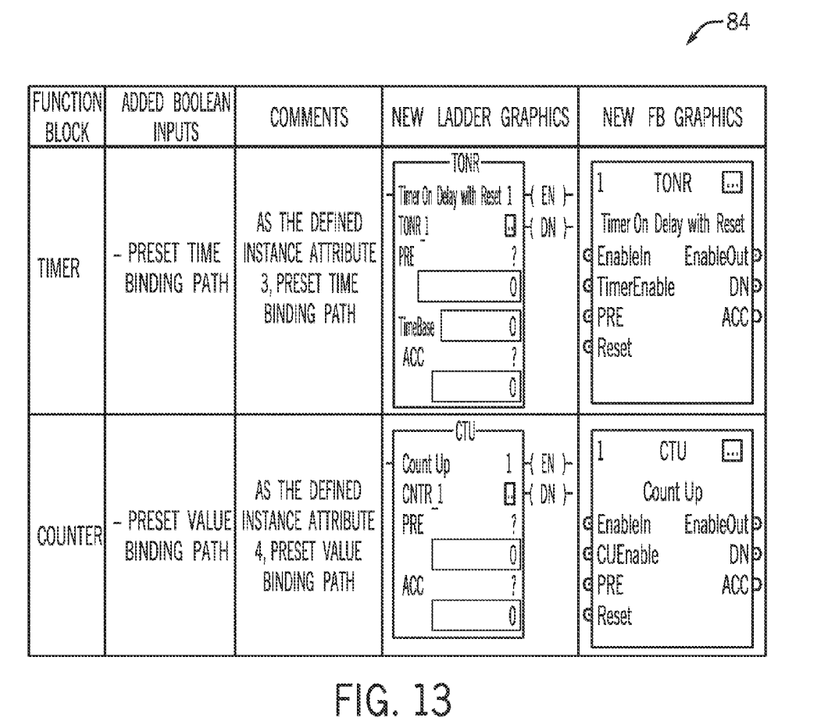
FIG. 13 is a list of exemplary function blocks having unbundled Boolean inputs, which are similar to the unbundled Boolean outputs described above.

FIG. 13 is a list 84 of exemplary function blocks 66 having unbundled Boolean inputs, which are similar to the unbundled Boolean outputs 78 described above. As shown, in both a Timer function block definition and a Counter function block definition, the function blocks 66 have added Boolean inputs such as a Preset Time Binding Path. In addition, certain function blocks 66 may include both added Boolean inputs and added Boolean outputs.

Figure 14:
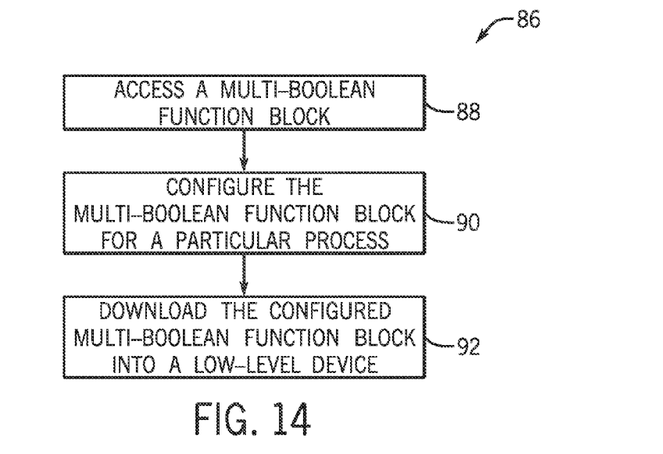
FIG. 14 is a flow chart of an exemplary method for distributed control of the machine/process.

FIG. 14 is a flow chart of an exemplary method 86 for distributed control of the machine/process 12. The method 86 involves configuring an automation device 18 to include multiple unbundled Boolean inputs and outputs, as described herein. In step 88, the method 86 includes accessing a multi-Boolean function block 66 configured to receive a plurality of inputs, to perform multiple Boolean logical operations based on the inputs, and to output any one of a plurality of logical outputs based upon the Boolean logical operations. For example, the multi-Boolean function block 66 may be accessed from the design-time library 52 of the configuration station 44 described above with respect to FIG. 4. In step 90, the method 86 includes configuring the multi-Boolean function block 66 for a particular automation process (e.g., the machine/process 12 described above). For example, as depicted in FIG. 4, the designer 62 may configure the multi-Boolean function block 66 for specific operation in the automation device 18 being configured via the browser 64. Step 90 may, for instance, include configuring at least one gain value being multiplied by at least one of the inputs received by the multi-Boolean function block 66. In step 92, the method 86 includes downloading the configured multi-Boolean function block 66 into the automation device 18. As described above, other function blocks 66 (e.g., possibly not having multiple Boolean inputs or outputs) may also be used to configure the automation device 18. In addition, as also described above, the multi-Boolean function block 66 (as well as other function blocks) may be uploaded from the automation device 18 into the configuration station 44 such that the designer 62 may see how the automation device 18 is currently configured (i.e., what function blocks 66 are currently programmed into the automation device 18).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for distributed control of a process, comprising:
    accessing a multi-Boolean function block configured to receive a plurality of inputs, to perform multiple Boolean logical operations based on the inputs, and to output any one of a plurality of logical outputs based upon the Boolean logical operations, wherein the plurality of inputs are accessible from the multi-Boolean function block as both a single bundle of the plurality of inputs and as the plurality of individual inputs, and the plurality of logical outputs are accessible from the multi-Boolean function block as both a single bundle of the plurality of logical outputs and as the plurality of individual logical outputs;
    configuring the multi-Boolean function block for a particular automation process; and
    downloading the configured multi-Boolean function block into a low-level distributed automation device.

2. The method of claim 1, wherein the multi-Boolean function block comprises non-transitory code configured in an object oriented programming language.

3. The method of claim 1, wherein the low-level distributed automation device comprises an input/output terminal block.

4. The method of claim 1, wherein the low-level distributed automation device comprises a push-button block.

5. The method of claim 1, wherein the low-level distributed automation device comprises a relay.

6. The method of claim 1, wherein the low-level distributed automation device comprises a motor drive or motor starter.

7. The method of claim 5, wherein the low-level distributed automation device comprises an overload relay.

8. The method of claim 6, wherein the low-level distributed automation device comprises a motor drive.

9. The method of claim 6, wherein the low-level distributed automation device comprises a motor starter.

10. The method of claim 1, wherein configuring the multi-Boolean function block comprises selectively configuring a plurality of memory registers from which the multi-Boolean function block reads the plurality of inputs as either the single bundle of the plurality of inputs or as the plurality of individual inputs based on input/output requirements of the low-level distributed automation device.

11. The method of claim 1, wherein configuring the multi-Boolean function block comprises selectively configuring a plurality of memory registers to which the multi-Boolean function block writes the plurality of logical outputs as either the single bundle of the plurality of logical outputs or as the plurality of individual logical output based on input/output requirements of the low-level distributed automation device.

12. The method of claim 1, wherein during operation, the low-level distributed automation device is coupled to an automation controller via a network, but receives the plurality of inputs and outputs any one of the plurality of outputs without command from the automation controller.

13. The method of claim 1, wherein the plurality of inputs comprises at least three inputs.

14. The method of claim 1, wherein the plurality of logical outputs comprises at least three outputs.

15. The method of claim 1, comprising configuring at least one gain value into the multi-Boolean function block, the gain value being multiplied by at least one of the inputs received by the multi-Boolean function block.

16. The method of claim 15, wherein the multi-Boolean function block comprises a proportional-integral-derivative function block.

17. The method of claim 1, comprising uploading the multi-Boolean function block from the low-level distributed automation device to a configuration station.

18. The method of claim 17, comprising displaying function blocks that are programmed into the low-level distributed automation device via the configuration station.

19. The method of claim 1, wherein the low-level distributed automation device is configured to control local operations of the low-level distributed automation device without communication with other automation devices.

20. The method of claim 1, wherein the low-level distributed automation device is not a programmable logic controller.

21. A method for distributed control of a process, comprising:
accessing a multi-Boolean function block configured to receive a plurality of inputs, to perform multiple Boolean logical operations based on the inputs, and to output any one of a plurality of logical outputs based upon the Boolean logical operations, wherein the multi-Boolean function block comprises non-transitory code configured in an object oriented programming language, and wherein the plurality of inputs are accessible from the multi-Boolean function block as both a single bundle of the plurality of inputs and as the plurality of individual inputs, and the plurality of logical outputs are accessible from the multi-Boolean function block as both a single bundle of the plurality of logical outputs and as the plurality of individual logical outputs;
configuring the multi-Boolean function block for a particular automation process, wherein configuring the multi-Boolean function block comprises:
selectively configuring a plurality of memory registers from which the multi-Boolean function block reads the plurality of inputs as either the single bundle of the plurality of inputs or as the plurality of individual inputs based on input/output requirements of a low-level distributed automation device into which the multi-Boolean function block is to be downloaded; or
selectively configuring a plurality of memory registers to which the multi-Boolean function block writes the plurality of logical outputs as either the single bundle of the plurality of logical outputs or as the plurality of individual logical output based on the input/output requirements of the low-level distributed automation device; and
downloading the configured multi-Boolean function block into the low-level distributed automation device, wherein the low-level distributed automation device comprises an input/output terminal block, a push-button block, a relay, a motor drive, or a motor starter, and wherein the low-level distributed automation device is configured to control local operations of the low-level distributed automation device without communication with other automation devices.

22. The method of claim 21, comprising uploading the multi-Boolean function block from the low-level distributed automation device to a configuration station.

23. The method of claim 22, comprising displaying function blocks that are programmed into the low-level distributed automation device via the configuration station.

* * * * *